UNITED STATES PATENT OFFICE.

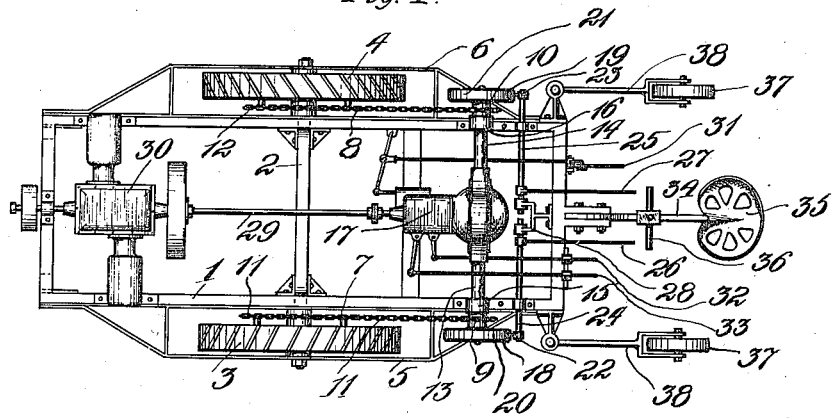

CHARLES B. KLEIN, OF LOS ANGELES, CALIFORNIA.

TRACTOR.

1,154,322.  Specification of Letters Patent.  Patented Sept. 21, 1915.

Application filed December 22, 1913. Serial No. 808,296.

*To all whom it may concern:*

Be it known that I, CHARLES B. KLEIN, a citizen of the United States, residing at Los Angeles, in the county of Los Angeles and State of California, have invented a certain new and useful Improvement in Tractors, of which the following is a specification.

My invention relates to a power tractor, principally for horticultural and agricultural purposes.

Objects of this invention are to provide a tractor, of simple, inexpensive and reasonably light construction, in which the road clearance is as high as practicable, the drag is effected from the front, and the direction of travel of the tractor controlled without any steering mechanism.

With these and other objects in view this invention consists of the features, details of construction and combination of parts, described in connection with the accompanying drawing and then more particularly pointed out in the claims.

In the drawing, Figure 1 is a plan view of my invention. Fig. 2 is a side elevation, and Fig. 3 is an end elevation, the power plant being omitted from this view.

Referring to the drawing, 1, designates a frame mounted on and rigidly connected with an inverted U-shaped axle 2, on the spindles of which are journaled traction wheels 3 and 4. The frame 1, is provided with depending braces 5 and 6, through which the spindles of the axle 2, extend, said braces serving to give strength to and hold the axle in vertical alinement. Secured to the wheels 3 and 4 are sprocket wheels 7 and 8, connected with sprocket wheels 9 and 10, by chains 11 and 12. Said sprocket wheels 9 and 10, are keyed or otherwise secured on shafts 13 and 14, journaled in pillow blocks 15 and 16, on said frame 1, the said shafts having an intermediate differential speed transmission mechanism, not shown, in a housing 17, whereby one shaft may revolve independently of the other in accordance with load variations. On said shafts 13 and 14, are mounted disks 18 and 19, over which are extended brake bands 20 and 21, connected with bell-cranks 22 and 23, on shafts 24 and 25, said bell-cranks being operable by levers 26 and 27 to contract and cause said brake bands 20 and 21, to grip said disks 18 and 19. As seen, these shafts 24 and 25, are carried by a suitable bearing 28, on the frame 1. The steering of the tractor is accomplished by the aforementioned brake bands 20 and 21, which, as is obvious, may be alternately tightened to grip one or the other of said disks. Thus any application of one of the bands to one of the disks 18 and 19, causes an additional load to be thrown thereon, effecting as a result, a retardation of the speed thereof, while the speed of the other disk is increased. The freely moving traction wheel travels under these conditions faster than the retarded one and in so doing causes the tractor to swerve. When the brake band is released, the two wheels 3 and 4 will again revolve in unison. Power is transmitted to said speed transmission mechanism through a shaft 29, and a gas or other engine 30, mounted on the frame 1, such mechanism being controlled by levers 31, 32 and 33, which forming no part of this invention and being of known construction, need no further description.

At or about the center of the rear of said frame 1, and extending outwardly therefrom, is a bar 34, carrying an adjustable seat 35, and an adjustable foot rest 36, for the operator. This bar 34, is so formed, as seen, that it may be inverted, as shown in Fig. 2, dotted lines, to afford a lower position for the operator, especially where close proximity to the ground is desirable to avoid injury to low hanging limbs and fruit laden branches of orchard trees. Where the greatest distance from the ground is required, as in cultivating corn and the like, the seat is adjusted to the elevated position as shown in Fig. 1, both positions affording an easy view of the progress of cultivation on account of the distance at which the seat is removed from the frame. In the latter instance of cultivation, the aforementioned U-shaped axle 2, is especially advantageous, since it is high enough to readily pass over the top of the corn stalks with no or the slightest contact. As seen, the frame is attached to the axle at or about the center thereof. To hold the said frame parallel with the ground, idlers 37, are provided, these idlers being journaled in legs 38, swiveled in the frame. The front of the tractor is provided with a plurality of draw-heads 39, formed preferably of two spaced pieces 40 and 41, having holes 42, for bolts 43, preferably carrying spaces 44. These drawheads 39, are provided for the purpose of attaching thereto the tongues, shafts or drag bars of agricultural implements, which when in position, operate between the said idlers 37 and the traction wheels 3 and 4. By reason of this forward disposition of said drawheads 39, it is obvious, that in dragging an implement, the pull exerted, will cause a tremendous traction and adhesion of the traction wheels to the ground. For this reason, the tractor may be made much lighter than any of known construction. In the drawing, these drawheads 39, are shown attached to the forward portion of the frame 1, because of the result attained thereby, as already explained. They may, however, be attached at any other point or to any other part of the tractor, for instance between the idlers 37 and traction wheels 3 and 4, which would be necessary where an unusually wide cultivator is used. To these drawheads 39, may also be directly attached, if desired, cultivator teeth, blades, or a cutter bar, which latter may be operated through a suitable connection or motion transmitting element, not shown, connecting the cutter bar operating mechanism with a pulley 45, on the engine shaft 46. Where the engine is not used to propel the tractor, it may through this pulley 45, be used to transmit power for any other purpose.

In Fig. 2, it will be noted that the holes 42 in the drawheads 39, begin on a line parallel with, and that the balance of them are below the center of the axle spindles. Where, therefore, an implement is attached to said drawheads at a point parallel with said spindles, whatever load is being drawn by the tractor, is thrown directly on the wheels 3 and 4, whereby obviously the tractive force thereof is considerably increased, and this tractive force is increased proportionally as the distance of attachment and the direct pull is increased below the axle spindle centers.

What I claim, is:—

1. A tractor comprising a frame, a wheeled axle formed to support said frame above the center of the wheels, a pair of idlers for the rear of said frame, a plurality of drawheads depending from said frame forward of the axle and below the center of said wheels, a motor, variable speed transmission means for said wheels, and means to govern said speed transmission to control the relative speeds of said wheels.

2. A tractor comprising an axle, wheels journaled on said axle, a frame, a propelling mechanism for said wheels, draw heads on said frame and forward of said axle and extending below the center of said axle, said draw heads having a plurality of holes provided in that portion of said drawheads which extends below said axle center, and a means in said holes for fastening thereto the drag bar of an implement.

3. A tractor comprising an axle, a pair of traction wheels journaled thereon, a frame connected centrally of its length to said axle, a pair of idlers for the rear of said frame, an implement drawing means attached to said frame forward of the axle, a propelling mechanism for said wheels, and means to govern the relative speeds of said wheels whereby to control the direction of travel of said tractor.

4. A tractor comprising an axle, a pair of wheels journaled on said axle, a frame connected centrally of its length to said axle, a pair of idlers for the rear of said frame, a plurality of draw heads depending from said frame, a means to drive said wheels and means to govern the relative speeds of said wheels whereby to control the direction of said tractor, and an invertible seat attached to the rear of said frame.

In testimony whereof I affix my signature in the presence of two witnesses.

CHARLES B. KLEIN.

Witnesses:
W. H. GAMBLE,
E. L. STILWELL.